Sept. 10, 1940.　　　　H. L. DE FREES　　　　2,214,163
STEERING COLUMN FOR PASSENGER VEHICLES
Filed Oct. 17, 1938　　　2 Sheets-Sheet 1

INVENTOR.
H. L. DeFREES
BY Maurice J. Fletcher
ATTORNEY.

Sept. 10, 1940.　　　H. L. DE FREES　　　2,214,163
STEERING COLUMN FOR PASSENGER VEHICLES
Filed Oct. 17, 1938　　　2 Sheets-Sheet 2
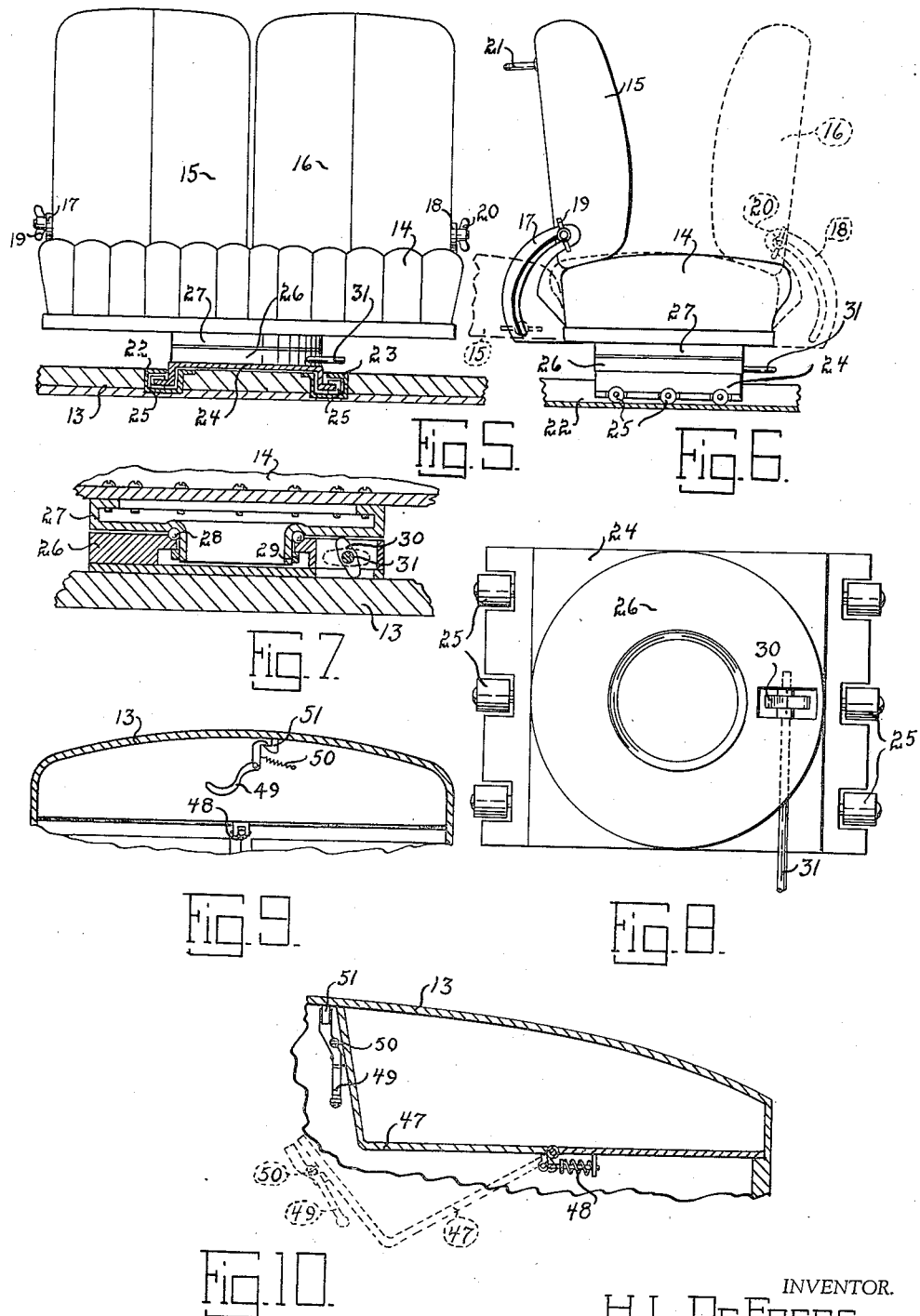
INVENTOR.
H. L. DE FREES
BY Maurice J. Fletcher
ATTORNEY.

Patented Sept. 10, 1940

2,214,163

UNITED STATES PATENT OFFICE 2,214,163

STEERING COLUMN FOR PASSENGER VEHICLES

Harry Lester De Frees, Des Moines, Iowa

Application October 17, 1938, Serial No. 235,331

3 Claims. (Cl. 74—493)

The principal object of this invention is to provide a passenger vehicle that is easily maneuverable in traffic, but which presents all the advantages of the house trailer or like.

A still further object of this invention is to provide a passenger vehicle having a removable steering wheel and fully adjustable seat so that the seat may perform several functions within the compartment. More specifically, the driving seat may be inclined at any angle, may be pivoted about and moved backwards or forwards within the vehicle and at the same time be adaptable for use as a bed.

A still further object of this invention is to provide a passenger vehicle in which the steering gear assembly may be removed from within the vehicle but whose steering gear assembly is provided with safety features to prevent the accidental displacement of the column while the vehicle is in operation.

A still further object of this invention is to provide a passenger vehicle that is economical in operation, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 5 is an enlarged front plan view of the adjustable seat member used in my vehicle.

Fig. 6 is a side sectional view of a portion of the vehicle with my seat mounted thereon, more fully illustrating its structure.

Fig. 7 is an enlarged cross sectional view of the turntable or rotary section of my vehicle seat.

Fig. 8 is an enlarged top plan view of the lower segment of the mounting gear of the seat of my vehicle more fully illustrating its structure.

Fig. 9 is an enlarged end view of the luggage compartment used within my vehicle.

Fig. 10 is a side sectional view of a portion of the vehicle and the luggage compartment more fully illustrating its structure.

Of late it has been the practice to use house trailers towed by an automotive vehicle for living quarters both for touring and in some cases, semipermanent dwellings. These trailers are very dangerous on the road in that they cannot be controlled and are often the cause of many accidents. These trailers require a wide radius of curve and are very hard to maneuver in metropolitan districts, it being virtually impossible to back them up for any great distance. Furthermore, these trailers require the use of the trailer itself and an automotive vehicle for towing it and, as the prime motive for using a trailer is economy, this phase increases the costs of the complete outfit. Heretofore, it has been undesirable to place the motor vehicle and the living quarters within one vehicle due to the great amount of space taken up by the driving seat, steering wheel and the like which could not be used in conjunction with the living quarters of the trailer and merely added considerable to the length of the device. This makes it impossible to place a trailer of sufficient size on the chassis of an ordinary commercial automobile. Also considerable difficulty has been encountered in providing sleeping quarters in the ordinary passenger vehicle due to lack of available space within the vehicle.

Figure 1:
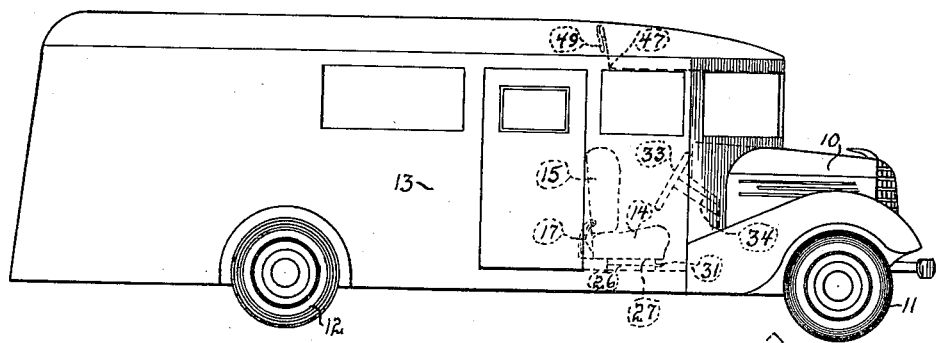
Fig. 1 is a side view of my complete passenger vehicle showing the seat, wheel and luggage compartment in dotted lines therein.

Referring to the drawings, I have used the numeral 10 to designate the motor portion of a vehicle chassis which has the ordinary front steerable wheels 11 and the traction wheels 12. The numeral 13 indicates a body portion or compartment mounted on the vehicle chassis and extending well out on the motor housing 10 as shown in Fig. 1. I have used the numeral 14 to designate a seat portion within the compartment 13. The numerals 15 and 16 indicate the two independent back portions of the seat. The numerals 17 and 18 designate two flanges secured to the seat 14. These flanges support the backs 15 and 16 respectively and provide for their adjustment. It will be noted that a bolt or like is secured to the back portions and extends through an arcuate slot in the flanges 17 and 18. The backs may be secured at any point of their travel by tightening wing nuts or the like 19 and 20 respectively. I have used the numeral 21 to designate a clothes bar or hanger secured to the seat backs 15 and 16 and which, when the backs are fully lowered, serves as a support when it is desirable to make a bed of the driver's seat.

I have used the numerals 22 and 23 to designate two spaced apart parallel channel members imbedded in the floor of the body portion 13 and extending parallel to the longitudinal axis thereof. I have used the numeral 24 to indicate a base member having its side marginal edges bent downwardly and outwardly so that it normally rests between the upper and lower surfaces of the longitudinal guide members or channels 22 and 23. The numeral 25 designates rollers spaced along each of these flange portions of the base 24, to facilitate the sliding movement of the base member 24 within the channels 22 and 23. Rigidly secured to the base member 24 is a circular flange 26. I have used the numeral 27 to designate a circular bearing portion rigidly secured to the lower central portion of the seat 14. This upper portion 27 is supported by ball bearings or the like 28 imposed between the flange 27 and the bearing member 26 as shown in Fig. 7. I have used the numeral 29 to designate a band secured about the lower portion of the stem of the bearing to prevent the accidental displacement of the member 27 relative to the member 26. Rotatably mounted within the base portion 26 is a cam 30 capable of engaging the floor 13 of the body and the flange 27 when rotated in one of its directions. The numeral 31 designates a rod rigidly secured to the cam 30 and extending to a point exterior of the base portion 26 to facilitate the manual operation of the cam 30. It will be noted that when the cam is in a position for contacting the portion 27 and the floor 13, that the seat 14 cannot be rotated due to the friction of the cam with the portion 27 and the base member cannot be moved within the channels 22 and 23 due to the friction of the cam on the floor portion 13 of the body but when the cam is in the position as shown by the dotted lines in Fig. 7, the mechanism will be free to allow the seat to be pivoted and also permitted to be moved forwardly or backwardly as desired.

Figure 3:
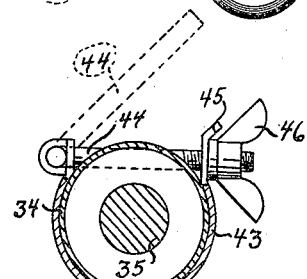
Fig. 3 is an enlarged end cross sectional view of the steering column taken on line 3—3 of Fig. 3 and more fully illustrating its structure.
Figures 2, 4:
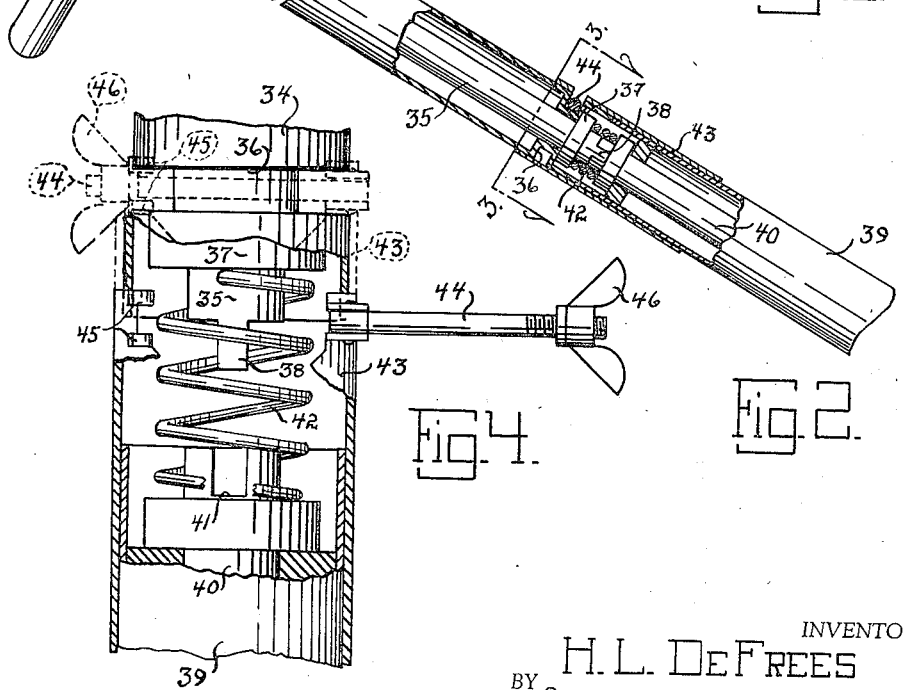
Fig. 2 is an enlarged side partial sectional view of the disengaging steering column used in my device.
Fig. 4 is an enlarged side sectional view of my steering apparatus disengaging means in an open or disengaging attitude.

In order to facilitate the movement of the seat and to provide more room within the body portion 13, I have provided a removable steering column apparatus which I will now describe. I have used the numeral 33 to designate the ordinary steering wheel having a casing 34 and the ordinary rotatably mounted shaft 35. Adjacent the lower end of the casing 34 is a peripheral groove 36 extending about the casing 34. The numeral 37 designates a flange formed on one end of the shaft 35 and adjacent the forward side of the peripheral groove 36 as shown in the drawings. The numeral 38 designates a tongue formed on the end of the shaft 35. I have used the numeral 39 to designate a second casing of the approximate diameter of the casing 34 having rotatably mounted therein an ordinary shaft 40. This shaft 40 is suitably supported within the casing 39 and has formed therein a groove 41 capable of receiving the tongue 38 at times. The numeral 42 designates a compression spring about the shafts 35 and 40 for yieldingly holding the tongue 38 out of engagement with the groove 41. The numeral 43 indicates a collar or sleeve rigidly secured to the casing 39 and extending beyond its rearward or upper end. Pivotally secured to the upper end of this sleeve 43 in a suitable manner is a bolt 44 which is pivotally secured and capable of contacting the fork 45 in the sleeve 43 for securing the lower casing 39 to the upper casing 34 when the tongue 38 is in engagement with the groove 41. The numeral 46 designates a wing nut for securely clamping the sleeve about the upper casing 34 when the bolt 44 extends through the groove 36 as shown in Fig. 3 of the drawings. From the above it will be noted that when the wing nut 46 is loosened so that it is out of engagement with the fork 45 of the sleeve 43, the bolt 44 may be pivoted upwardly out of engagement with the groove 36. The compression spring 42 will then force the tongue 38 out of engagement with the groove 41 permitting the upper half of the steering column to be removed thus providing more room within the passenger compartment of the vehicle when it is being used for purposes other than transportation. When assemblying the steering column, it is merely necessary to force the shaft 35 and casing 34 into the sleeve 43 and against the compression of the spring 42 and the tongue 38 is in engagement with the groove 41 and it will be necessary to forceably hold it in this position until the bolt 44 is placed in engagement with the peripheral groove 36 and the wing nut tightened. It will here be noted that the lower end of the spring 42 may be permanently secured to the shaft 40 and this spring 42 prevents the accidental displacement or the inadvertent false assembly of the steering column assuring a rigid steering column when once locked in position.

I have further provided in my vehicle a storage compartment as shown in Figs. 1, 9 and 10 of the drawings. This storage compartment is in the forward upper end of the body 13 and has thereon a door or trap member 47 pivotally secured to and capable of covering the compartment. I have used the numeral 48 to indicate a balancing spring for yieldingly holding the door member 47 in a closed position. The numeral 49 designates a catch handle member pivotally secured to the door 47 and yieldingly held in one of its positions by a spring 50. I have used the numeral 51 to indicate the catch member secured to the roof or top of the body portion 13. From this construction, it will be noted that in order to open the compartment, it is merely necessary to pull downwardly upon the handle member 49, thus releasing the handle catch from the catch 51. The same movement is continued and the door 47 is swung downwardly permitting access to the compartment. However, when the handle member is released or should it be accidentally displaced, the spring 48 will return the door 47 to a closed position and yieldingly hold it there.

The practical operation of my device is as follows: When it is desirable to have more space within a vehicle whether it be an ordinary passenger automobile or one fitted out as a living compartment, the seat 14 may be moved to any position of its sliding movement within the channels 22 and 23 by releasing the cam 30 and the seat portion may also be pivoted to any position within the compartment. Each of the back portions 15 and 16 may be lowered or raised individually to any position and may be fully lowered to permit the use of the seat as a bed, cot or like. By manually actuating the cam 30 through the medium of the handle rod member 31, the entire seat assembly may be locked in any position.

The steering column of my device is readily and safely removed to permit greater usable area within the vehicle when the same is not being used for transportation and by providing the peripheral groove 36, bolt 44, and compression spring 42, the device must be positively and forceably locked before the steering apparatus will be workable, thus assuring that care will be taken in the assemblying of the steering apparatus and preventing accidents due to an operator carelessly assemblying the steering mechanism. All of my devices permit a greater adaptable area within the vehicle, may be adapted to all types of vehicles and may be used to advantage in any ordinary passenger automotive vehicle body and in living compartment coaches preventing the space ordinarily occupied by the driver from being useless as a part of the living compartment. By constructing such a compact unit having all of its space readily accessible, an entire living compartment may be thus placed upon an ordinary passenger automobile chassis and may be controlled exactly as an automobile eliminating unnecessary auxiliary brakes and uncertainties of trailers and like in traffic and provides easy manipulation of the vehicle. Thus it will be seen that I have provided a vehicle construction that fulfills all of my objects and further combines all the advantages and pleasures of a living compartment that has the mobility and maneuverability of a passenger vehicle.

Some changes may be made in the construction and arrangement of my improved passenger vehicle without departing from the real spirit and purpose of my invention, and it is my intention to cover by my claims any modified forms of structure or use of mechanical equivalents which may be reasonably included within their scope.

I claim:

1. In a device of the class described, a steering gear assembly designed to be used in a vehicle, comprising, a steering wheel, an upper casing, a peripheral groove formed in the lower end of said upper casing, a shaft rotatably mounted in said casing and having its upper end operatively secured to said steering wheel, a tongue on the lower end of said shaft, a second shaft designed to have its lower end secured to a steering apparatus of a vehicle, a casing about the said second mentioned shaft, a groove in the upper end of the said second mentioned shaft capable of receiving said tongue at times, a sleeve rigidly secured about said second mentioned casing, and a locking means pivotally secured to the upper end of said sleeve and capable of being received by said peripheral groove when said tongue of said first mentioned shaft is in engagement with said groove of said second mentioned groove.

2. In a device of the class described, a steering gear assembly designed to be used in a vehicle, comprising, a steering wheel, an upper casing, a peripheral groove formed in the lower end of said upper casing, a shaft rotatably mounted in said casing and having its upper end operatively secured to said steering wheel, a tongue on the lower end of said shaft, a second shaft designed to have its lower end secured to a steering apparatus of a vehicle, a casing about the said second mentioned shaft, a groove in the upper end of said second mentioned shaft capable of receiving said tongue at times, a sleeve rigidly secured about said second mentioned casing, a locking means pivotally secured to the upper end of said sleeve and capable of being received by said peripheral groove when said tongue of said first mentioned shaft is in engagement with said groove of said second mentioned shaft, and a compression spring about said first and said second mentioned shafts for yieldingly holding said tongue out of engagement with said gear at times.

3. In a steering column designed to be used in a passenger automotive vehicle, a cylindrical housing, a peripheral channel adjacent the end of said cylindrical housing, a second cylindrical housing, a sleeve formed on the outer surface of said second mentioned cylindrical housing and extending beyond its end portion, a shaft rotatably mounted in said first mentioned cylindrical housing, a tongue formed on the end of said shaft, a shaft rotatably mounted in said second mentioned housing and designed to have its lower end in operative engagement with the steering control devices of the vehicle, a groove in the upper end of said second mentioned shaft designed to receive said tongue of said first mentioned shaft at times, a coil spring about said shafts for yieldingly holding said tongue out of engagement with said groove, and a means for locking said first and said second mentioned housings together at times when said tongue is in engagement with said groove.

HARRY LESTER DE FREES.